US012657401B2

(12) United States Patent
Garcia Delgado et al.

(10) Patent No.: US 12,657,401 B2
(45) Date of Patent: Jun. 16, 2026

(54) CONVERSATIONAL COLLABORATION IN A METAVERSE ENVIRONMENT

(71) Applicant: International Business Machines Corporation, Armonk, NY (US)

(72) Inventors: Carolina Garcia Delgado, Zapopan (MX); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 18/520,949

(22) Filed: Nov. 28, 2023

(65) Prior Publication Data

US 2025/0173516 A1     May 29, 2025

(51) Int. Cl.
*G06F 40/40*       (2020.01)
*G06T 13/40*       (2011.01)
*G10L 13/00*       (2006.01)

(52) U.S. Cl.
CPC .............. *G06F 40/40* (2020.01); *G06T 13/40* (2013.01); *G10L 13/00* (2013.01)

(58) Field of Classification Search
USPC ............................................... 704/7–10, 257
See application file for complete search history.

(56) References Cited

U.S. PATENT DOCUMENTS

| | | | |
|---|---|---|---|
| 12,249,014 B1 * | 3/2025 | Khorshid .............. | G06T 19/006 |
| 2010/0064359 A1 | 3/2010 | Boss | |

| | | | |
|---|---|---|---|
| 2010/0083138 A1 | 4/2010 | Dawson | |
| 2010/0180216 A1 | 7/2010 | Bates | |
| 2016/0357744 A1 | 12/2016 | Kozloski | |
| 2017/0242886 A1 * | 8/2017 | Jolley ................... | G06F 40/211 |
| 2017/0242899 A1 * | 8/2017 | Jolley ................... | G06F 16/242 |

(Continued)

FOREIGN PATENT DOCUMENTS

| | | |
|---|---|---|
| KR | 102434060 B1 | 8/2022 |

OTHER PUBLICATIONS

Anonymous, "Visual representation of participant roles in an online meeting or chat, and visual representation used to influence the meeting flow", IP.com No. IPCOM000181704D, IP.com Electronic Publication Date: Apr. 9, 2009, 4 pages.

(Continued)

*Primary Examiner* — Leonard Saint-Cyr
(74) *Attorney, Agent, or Firm* — Elliot J. Shine

(57)     ABSTRACT

A computer-implemented method, a computer program product, and a computer system for conversational collaboration in a metaverse environment. A computer uses natural language processing to understand a question of a user about an object in the metaverse environment. A computer constructs an aggregated response to the question, based on one or more responses in the metaverse environment. A computer identifies authentic sources and unauthentic sources of the aggregated response. A computer deploys first avatars for the authentic sources and second avatars for the unauthentic sources. A computer causes the first avatars to perform a spoken conversation based on the authentic sources, with a first type of tone and body language. A computer causes the second avatars to perform a spoken conversation based on the unauthentic sources, with a second type of tone and body language.

19 Claims, 4 Drawing Sheets

TO STEP 209 IN FIG. 2(A)

210 — IDENTIFY WHICH PORTIONS OF THE AGGREGATED RESPONSE ARE THE ONE OR MORE AUTHENTIC SOURCES, THE ONE OR MORE UNAUTHENTIC SOURCES, AND THE ONE OR MORE PERSONAL SOURCES

211 — CONSTRUCT A SPOKEN TRANSCRIPT OF THE AGGREGATED RESPONSE

212 — DEPLOY FIRST ONE OR MORE AVATARS FOR THE ONE OR MORE AUTHENTIC SOURCES, SECOND ONE OR MORE AVATARS FOR THE ONE OR MORE UNAUTHENTIC SOURCES, AND THIRD ONE OR MORE AVATARS FOR THE ONE OR MORE PERSONAL SOURCES

213 — MAP FIRST ONE OR MORE PORTIONS OF THE SPOKEN TRANSCRIPT TO THE FIRST ONE OR MORE AVATARS, SECOND ONE OR MORE PORTIONS OF THE SPOKEN TRANSCRIPT TO THE SECOND ONE OR MORE AVATARS, AND THIRD ONE OR MORE PORTIONS OF THE SPOKEN TRANSCRIPT TO THE THIRD ONE OR MORE AVATARS

214 — CAUSE THE FIRST ONE OR MORE AVATARS TO PERFORM A SPOKEN CONVERSATION OF THE FIRST ONE OR MORE PORTIONS OF THE SPOKEN TRANSCRIPT, WITH A FIRST TYPE OF TONE AND BODY LANGUAGE

215 — CAUSE THE SECOND ONE OR MORE AVATARS TO PERFORM A SPOKEN CONVERSATION OF THE SECOND ONE OR MORE PORTIONS OF THE SPOKEN TRANSCRIPT, WITH A SECOND TYPE OF TONE AND BODY LANGUAGE

216 — CAUSE THE THIRD ONE OR MORE AVATARS TO PERFORM A SPOKEN CONVERSATION OF THE THIRD ONE OR MORE PORTIONS OF THE SPOKEN TRANSCRIPT, WITH A THIRD TYPE OF TONE AND BODY LANGUAGE

(56) References Cited

U.S. PATENT DOCUMENTS

| | | | | |
|---|---|---|---|---|
| 2017/0243107 A1* | 8/2017 | Jolley | .................. | G06N 5/02 |
| 2022/0150071 A1 | 5/2022 | Schwarz | | |
| 2023/0071994 A1* | 3/2023 | Day | .................. | G16H 50/20 |
| 2023/0230293 A1* | 7/2023 | Kaplan | .................. | G06F 3/011 |
| | | | | 345/156 |
| 2023/0289817 A1* | 9/2023 | Ashby | .................. | H04L 9/3226 |
| 2024/0022553 A1* | 1/2024 | Ingram | .................. | H04L 63/08 |
| 2024/0045704 A1* | 2/2024 | Khorshid | .............. | G06F 3/011 |
| 2024/0050003 A1* | 2/2024 | Day | .................. | A61B 5/7267 |
| 2024/0119932 A1* | 4/2024 | Khorshid | .............. | G06Q 50/01 |
| 2025/0218097 A1* | 7/2025 | Khorshid | .............. | G06T 15/005 |

OTHER PUBLICATIONS

Disclosed Anonymously, "Human-Created Content Indication", IP.com No. IPCOM000272492D, IP.com Electronic Publication Date: Jun. 13, 2023, 6 pages.
Disclosed Anonymously, "System and Method of Marketing Collaborative Interactions in an Avatar Based Environment", IP.com No. IPCOM000248996D, IP.com Electronic Publication Date: Jan. 25, 2017, 3 pages.

* cited by examiner

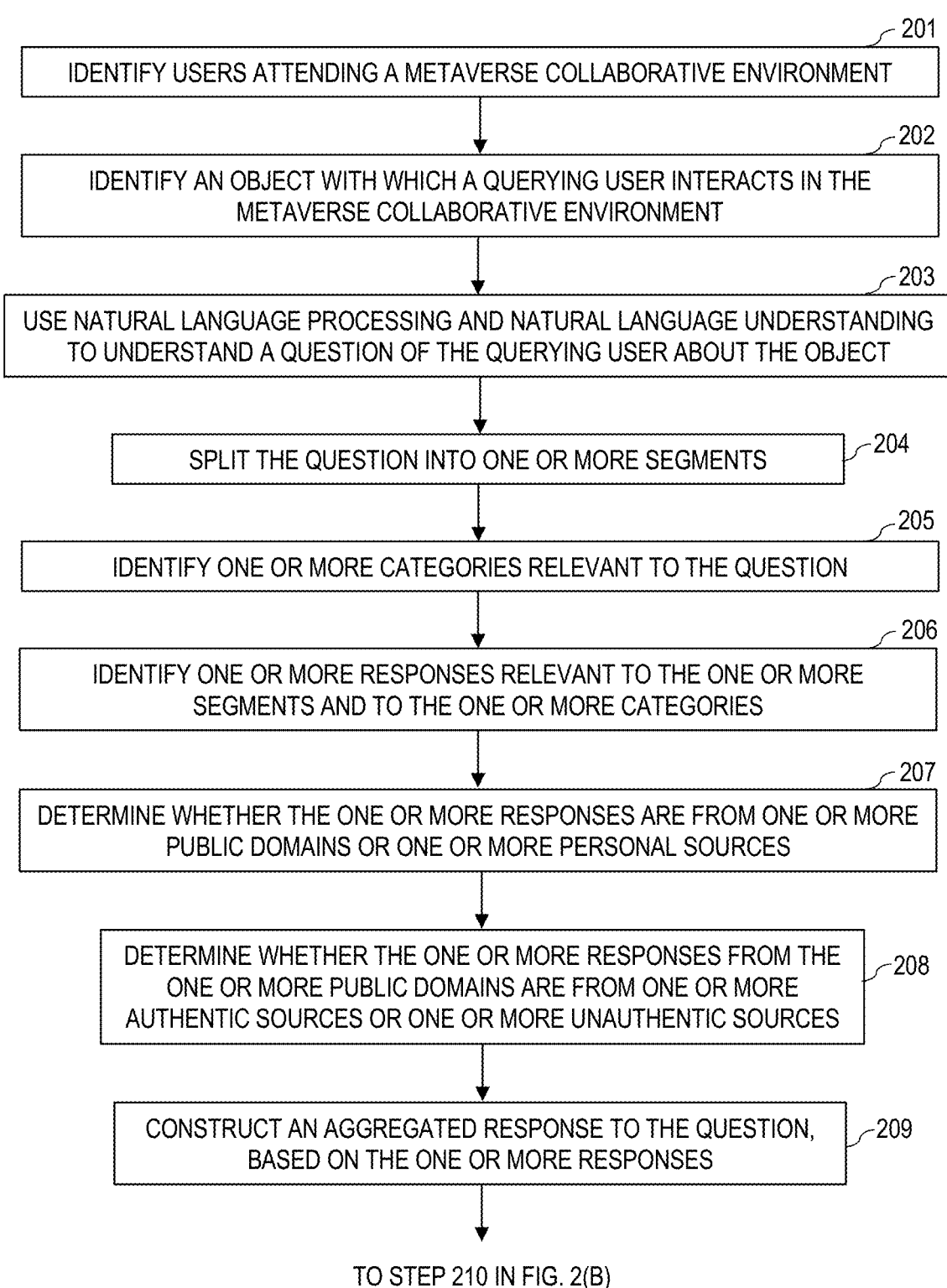

201
IDENTIFY USERS ATTENDING A METAVERSE COLLABORATIVE ENVIRONMENT

202
IDENTIFY AN OBJECT WITH WHICH A QUERYING USER INTERACTS IN THE METAVERSE COLLABORATIVE ENVIRONMENT

203
USE NATURAL LANGUAGE PROCESSING AND NATURAL LANGUAGE UNDERSTANDING TO UNDERSTAND A QUESTION OF THE QUERYING USER ABOUT THE OBJECT

204
SPLIT THE QUESTION INTO ONE OR MORE SEGMENTS

205
IDENTIFY ONE OR MORE CATEGORIES RELEVANT TO THE QUESTION

206
IDENTIFY ONE OR MORE RESPONSES RELEVANT TO THE ONE OR MORE SEGMENTS AND TO THE ONE OR MORE CATEGORIES

207
DETERMINE WHETHER THE ONE OR MORE RESPONSES ARE FROM ONE OR MORE PUBLIC DOMAINS OR ONE OR MORE PERSONAL SOURCES

208
DETERMINE WHETHER THE ONE OR MORE RESPONSES FROM THE ONE OR MORE PUBLIC DOMAINS ARE FROM ONE OR MORE AUTHENTIC SOURCES OR ONE OR MORE UNAUTHENTIC SOURCES

209
CONSTRUCT AN AGGREGATED RESPONSE TO THE QUESTION, BASED ON THE ONE OR MORE RESPONSES

TO STEP 210 IN FIG. 2(B)

FIG. 2(A)

TO STEP 209 IN FIG. 2(A)

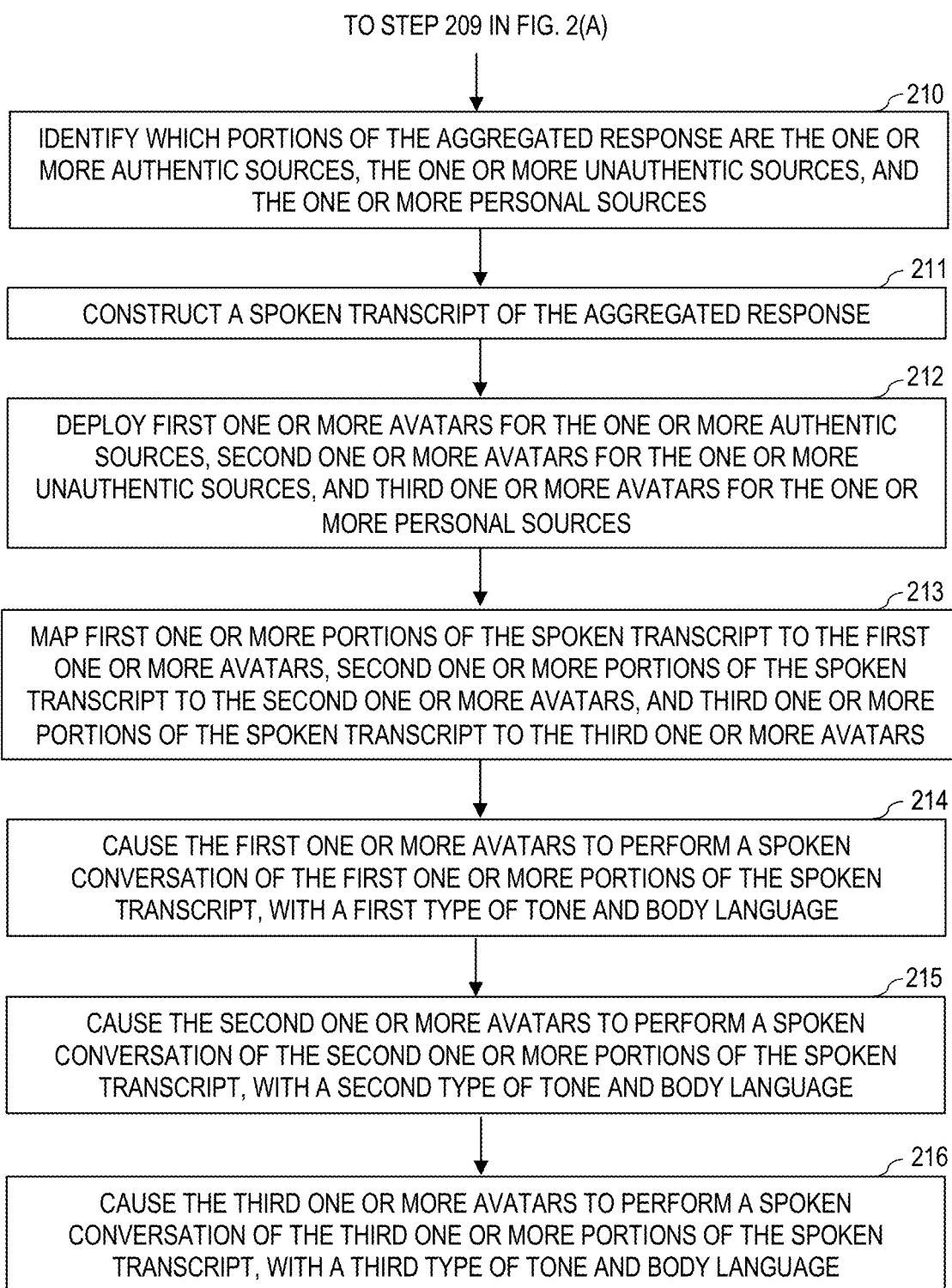

210

IDENTIFY WHICH PORTIONS OF THE AGGREGATED RESPONSE ARE THE ONE OR MORE AUTHENTIC SOURCES, THE ONE OR MORE UNAUTHENTIC SOURCES, AND THE ONE OR MORE PERSONAL SOURCES

211

CONSTRUCT A SPOKEN TRANSCRIPT OF THE AGGREGATED RESPONSE

212

DEPLOY FIRST ONE OR MORE AVATARS FOR THE ONE OR MORE AUTHENTIC SOURCES, SECOND ONE OR MORE AVATARS FOR THE ONE OR MORE UNAUTHENTIC SOURCES, AND THIRD ONE OR MORE AVATARS FOR THE ONE OR MORE PERSONAL SOURCES

213

MAP FIRST ONE OR MORE PORTIONS OF THE SPOKEN TRANSCRIPT TO THE FIRST ONE OR MORE AVATARS, SECOND ONE OR MORE PORTIONS OF THE SPOKEN TRANSCRIPT TO THE SECOND ONE OR MORE AVATARS, AND THIRD ONE OR MORE PORTIONS OF THE SPOKEN TRANSCRIPT TO THE THIRD ONE OR MORE AVATARS

214

CAUSE THE FIRST ONE OR MORE AVATARS TO PERFORM A SPOKEN CONVERSATION OF THE FIRST ONE OR MORE PORTIONS OF THE SPOKEN TRANSCRIPT, WITH A FIRST TYPE OF TONE AND BODY LANGUAGE

215

CAUSE THE SECOND ONE OR MORE AVATARS TO PERFORM A SPOKEN CONVERSATION OF THE SECOND ONE OR MORE PORTIONS OF THE SPOKEN TRANSCRIPT, WITH A SECOND TYPE OF TONE AND BODY LANGUAGE

216

CAUSE THE THIRD ONE OR MORE AVATARS TO PERFORM A SPOKEN CONVERSATION OF THE THIRD ONE OR MORE PORTIONS OF THE SPOKEN TRANSCRIPT, WITH A THIRD TYPE OF TONE AND BODY LANGUAGE

CONVERSATIONAL COLLABORATION IN A METAVERSE ENVIRONMENT

BACKGROUND

The present invention relates generally to a metaverse environment, and more particularly to conversational collaboration in a metaverse environment with visualization of types of information sources.

Metaverse collaboration refers to the collaborative interaction and engagement of users within a shared virtual space known as a metaverse. The metaverse is a virtual reality (VR) or augmented reality (AR) environment where users can interact with each other and digital objects in real-time. In a metaverse, users can engage in various collaborative activities, such as communication, content creation, problem-solving, and social interactions. Users can interact with different objects in a metaverse, and the objects may include virtual representations of physical objects, three-dimensional models, multimedia content, and interactive elements.

SUMMARY

In one aspect, a computer-implemented method for conversational collaboration in a metaverse environment is provided. The computer-implemented method comprises using natural language processing to understand a question of a user about an object in the metaverse environment. The computer-implemented method further comprises constructing an aggregated response to the question, based on one or more responses in the metaverse environment. The computer-implemented method further comprises identifying one or more authentic sources of the aggregated response and one or more unauthentic sources of the aggregated response. The computer-implemented method further comprises deploying first one or more avatars for the one or more authentic sources and second one or more avatars for the one or more unauthentic sources. The computer-implemented method further comprises causing the first one or more avatars to perform a spoken conversation based on the one or more authentic sources, with a first type of tone and body language. The computer-implemented method further comprises causing the second one or more avatars to perform a spoken conversation based on the one or more unauthentic sources, with a second type of tone and body language.

In another aspect, a computer program product for conversational collaboration in a metaverse environment is provided. The computer program product comprises a computer readable storage medium having program instructions embodied therewith, and the program instructions are executable by one or more processors. The program instructions are executable to use natural language processing to understand a question of a user about an object in the metaverse environment. The program instructions are further executable to construct an aggregated response to the question, based on one or more responses in the metaverse environment. The program instructions are further executable to identify one or more authentic sources of the aggregated response and one or more unauthentic sources of the aggregated response. The program instructions are further executable to deploy first one or more avatars for the one or more authentic sources and second one or more avatars for the one or more unauthentic sources. The program instructions are further executable to cause the first one or more avatars to perform a spoken conversation based on the one or more authentic sources, with a first type of tone and body language. The program instructions are further executable to cause the second one or more avatars to perform a spoken conversation based on the one or more unauthentic sources, with a second type of tone and body language.

In yet another aspect, a computer system for conversational collaboration in a metaverse environment is provided. The computer system comprises one or more processors, one or more computer readable tangible storage devices, and program instructions stored on at least one of the one or more computer readable tangible storage devices for execution by at least one of the one or more processors. The program instructions are executable to: use natural language processing to understand a question of a user about an object in the metaverse environment; construct an aggregated response to the question, based on one or more responses in the metaverse environment; identify one or more authentic sources of the aggregated response and one or more unauthentic sources of the aggregated response; deploy first one or more avatars for the one or more authentic sources and second one or more avatars for the one or more unauthentic sources; cause the first one or more avatars to perform a spoken conversation based on the one or more authentic sources, with a first type of tone and body language; and cause the second one or more avatars to perform a spoken conversation based on the one or more unauthentic sources, with a second type of tone and body language.

BRIEF DESCRIPTION OF THE SEVERAL VIEWS OF THE DRAWINGS

FIG. 2(A) and FIG. 2(B) is a flowchart showing operational steps of conversational collaboration in a metaverse environment, in accordance with one embodiment of the present invention.

DETAILED DESCRIPTION

Figure 1:
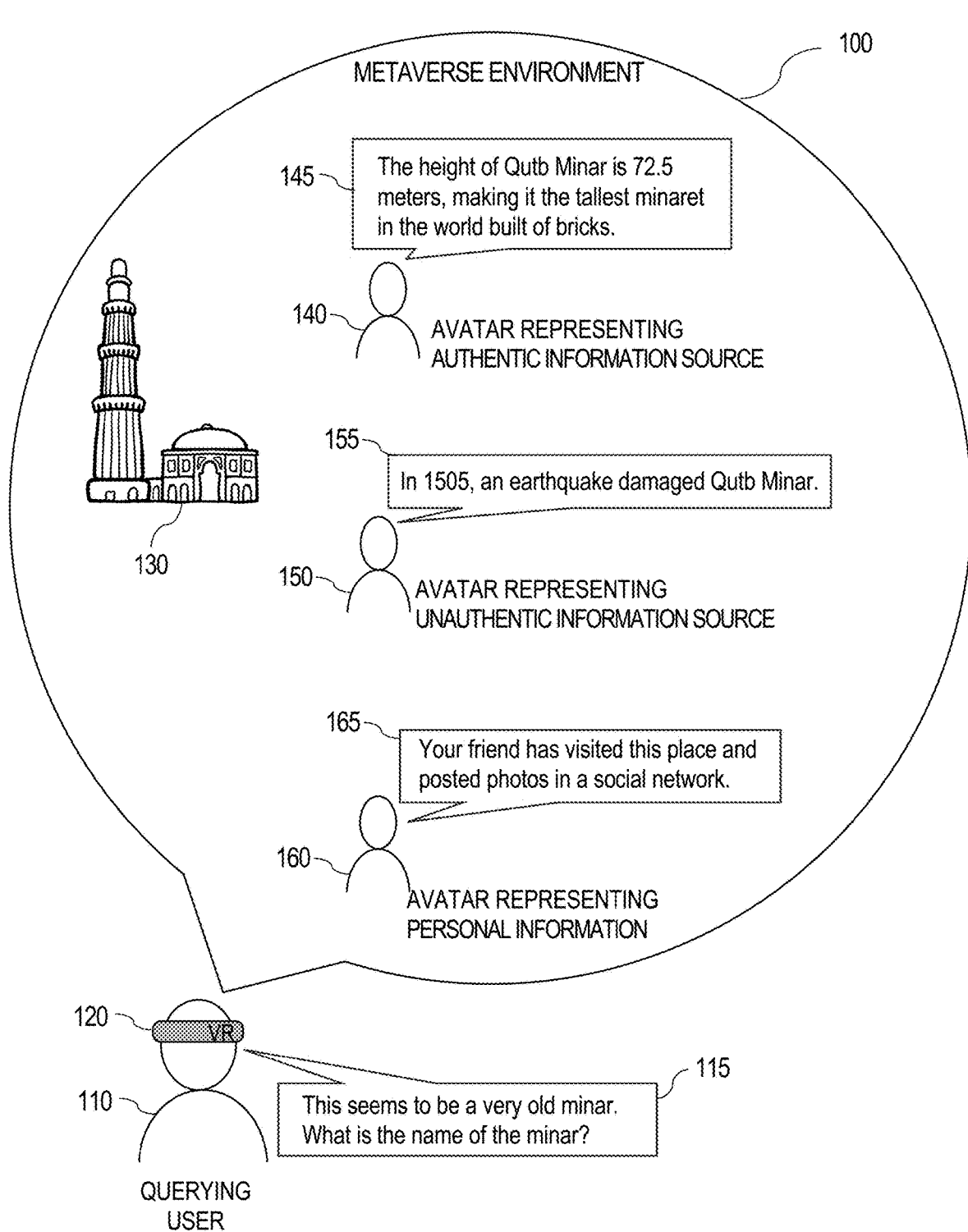
FIG. 1 illustrates conversational collaboration in a metaverse environment, in accordance with one embodiment of the present invention.

Embodiments of the present invention disclose an approach to conversational collaboration in a metaverse environment. In a metaverse environment, user interaction with different objects typically involves several modalities and technologies as follows. (1) In a metaverse environment, users are represented by avatars and avatars are digital representations of user themselves. Avatars may be customized to reflect the user's appearances, preferences, and actions. Users may be able to control their avatars to move, interact, and communicate with other users and objects. (2) In a metaverse environment, users may use gestures and body movements to interact with objects. Gestures and body movements may include actions, such as pointing, grabbing, throwing, pushing, or any other physical gestures that are tracked by motion capture devices or tracked controllers. (3) Within an metaverse environment, users can communicate with each other and with objects through voice chat or audio communication systems. The communication systems allow users for real-time conversations, collaboration, and coordination. (4) Within a metaverse environment, users interact with virtual interfaces or user interfaces (UI). These interfaces may include menus, buttons, sliders, text input fields, and other interactive elements that enable users to control and manipulate objects, change settings, or access information. (5) In an metaverse environment, haptic feedback technologies can provide users with tactile sensations to enhance the sense of touch and interaction with virtual objects. This can include devices such as haptic gloves, vests, or controllers that simulate sensations like pressure, vibration, or texture. (6) In an metaverse environment, spatial computing technologies, such as augmented reality (AR) or mixed reality (MR) headsets, allow users to perceive and interact with virtual objects in the physical world. Users can overlay digital content onto their real environment, enabling interaction with virtual objects within their physical surroundings. (7) In a metaverse environment, users can collaborate and interact with each other simultaneously. Users can engage in shared experiences, co-create content, participate in virtual events, or work together on projects within a virtual environment.

While interacting with a metaverse environment, a user may have a query on different types of objects, contextual scenario, etc. If the user needs to ask a question against a object or context, then responses may be provided from trusted sources or non-trusted sources. Thus, the user may have difficulty to understand which response or which portion of a response is authentic and which is not. Embodiments of the present invention propose a method and system for conversational collaboration in a metaverse environment. The proposed method and system provide a way for the user to understand which response or which portion of a response is from a trusted source or a non-trusted source.

When a querying user interacts in a metaverse collaborative environment, the querying user asks a question against a scenario or an object which is present in the metaverse collaborative environment. The disclosed method and system causes one or more virtual avatars to dynamically appear in the metaverse collaborative environment, and the one or more virtual avatars verbally provide one or more responses to the question. If a response is received from a trusted or authentic source, then proposed method and system create an appropriate visual distinction in an appearance of an avatar which represents the response from the trusted or authentic source. If a response is received from a non-trusted or unauthentic source, then proposed method and system create a different appearance of an avatar which represents the response from the non-trusted or unauthentic source. Therefore, the querying user can determine whether the response is received from a trusted source or non-trusted source, based on appearances of avatars.

If a response to the question of the querying user is from a mix of authentic and unauthentic sources, then proposed method and system create at least two avatars dynamically with appropriate distinctions between avatars which speak authentic sources of information and avatars which speak unauthentic sources of information. Therefore, the querying user can understand which information is from trusted sources or non-trusted sources.

When dynamically creating avatars, based on different levels of authenticity of responses, the proposed method and system dynamically incorporate body language and levels of confidence of different avatars during response. Therefore, the querying user can determine different levels of authenticity of the responses.

In a metaverse collaborative environment, a responding user may include personal sources of information (such user's own social network content, content stored in personal devices etc) in a response to the question. The proposed method and system will show an appropriate visual distinction of a avatar which represents the responding user;

therefore, the querying user can identify that the response includes personal sources of information.

In a metaverse collaborative environment, different portions of a response to the querying user's question may have different level of authenticity and may also need personal information. The proposed method and system will show different avatars and create a natural language conversation among the different avatars in an entire response to the querying user's question. Therefore, the querying user can identify which portion of the entire response is trusted (authentic) and which portion is non-trusted (unauthentic).

If a personal source of information is in a portion of the response to the querying user's question, the proposed method and system will enforce appropriate security. Therefore, the response provided by an avatar dedicated for the portion including the personal information source will not be sent to any cloud server.

FIG. 1 illustrates conversational collaboration in metaverse environment 100, in accordance with one embodiment of the present invention. Querying user 110 attends metaverse environment 100. Querying user 110 uses an augmented reality device 120 to interact with different objects in metaverse environment 100. The objects in metaverse environment 100 may include virtual representations of physical objects, three-dimensional models, multimedia content, and interactive elements. In the example shown in FIG. 1, object 130 appears; object 130 is an old minar. Querying user 110 asks question 115 about old minar. For example, question 115 is "This seems to be a very old minar. What is the name of the minar?"

The proposed method and system create three avatars, for example, in metaverse environment 100. The three avatars include avatar 140 representing authentic (trusted) information source, avatar 150 representing unauthentic information source, and avatar 160 representing personal information. For example, avatar 140 speaks response 145 "The height of Qutb Minar is 72.5 meters, making it the tallest minaret in the world built of bricks." For example, avatar 150 speaks response 155 "In 1505, an earthquake damaged Qutb Minar." For example, avatar 160 speaks response 165 "Your friend has visited this place and posted photos in a social network."

The proposed method and system create the three avatars dynamically with appropriate visual distinctions among appearances of avatar 140, avatar 150, and avatar 160. The proposed method and system may create avatar 140, avatar 150, and avatar 160 which show different types of tones and body languages. Therefore, querying user 110 can identify that response 145 spoken by avatar 140 is from a trusted or authentic source, response 155 spoken by avatar 150 is from a non-trusted or unauthentic source, and response 165 spoken by avatar 160 is from a personal source.

Figure 3:
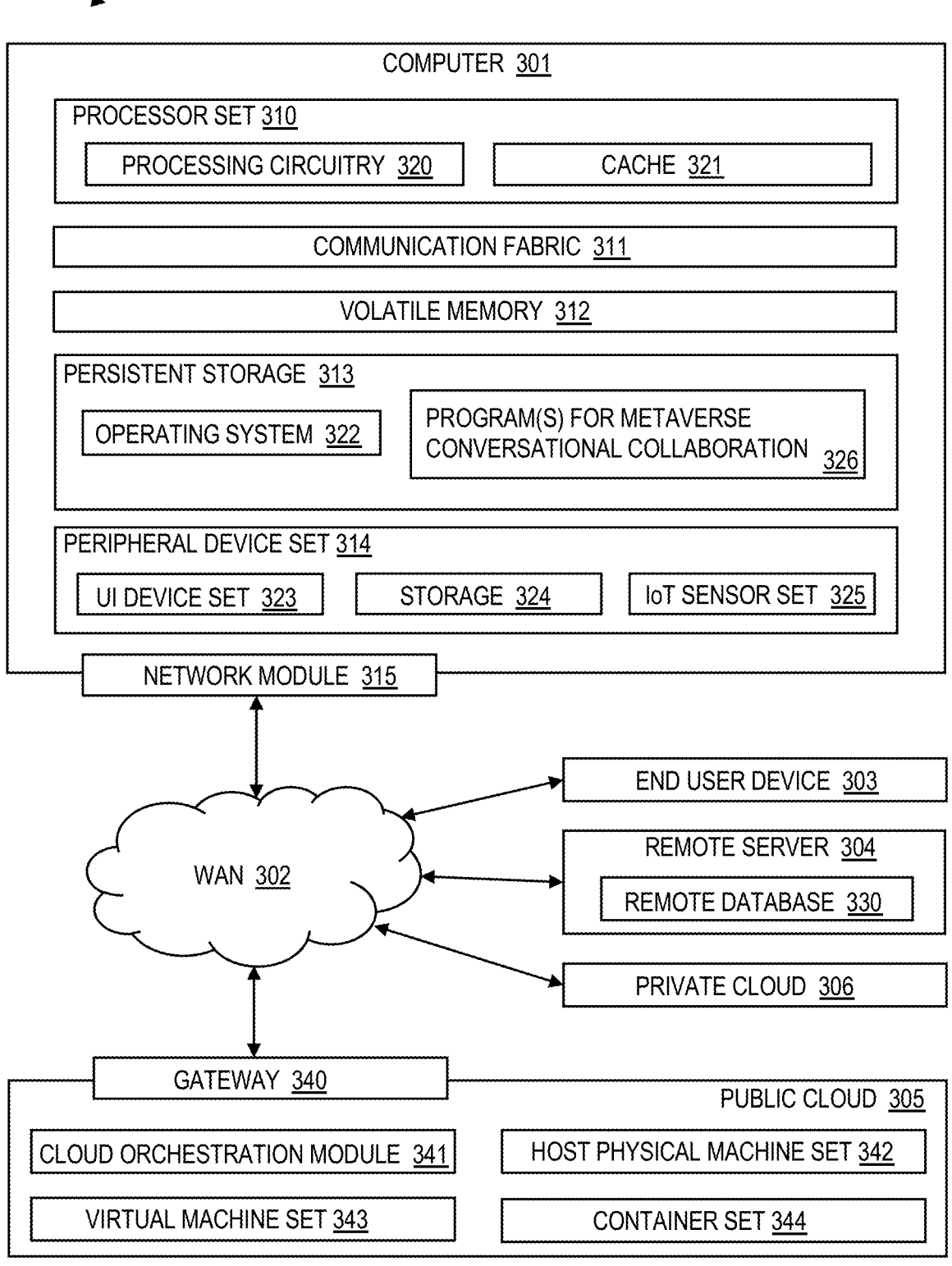
FIG. 3 is a systematic diagram illustrating an example of an environment for the execution of at least some of the computer code involved in performing conversational collaboration in a metaverse environment, in accordance with one embodiment of the present invention.

FIG. 2(A) and FIG. 2(B) is a flowchart showing operational steps of conversational collaboration in a metaverse environment, in accordance with one embodiment of the present invention. The operational steps are executed by the proposed system which is hosted by a computer system or a server. Computer 301 shown in FIG. 3 is a typical computer system or server.

In step 201, the computer system or server identifies users attending a metaverse collaborative environment. The computer system or server identifies the individual users who attend in the metaverse collaborative environment and recognize each and every user individually. The computer or server uses an user interaction tracking system. The user interaction tracking system tracks user's interactions within the metaverse collaborative environment. Tracking user's interactions may include capturing data such as the user's position, actions performed, objects touched or selected, or any spoken conversation. The user's interactions can be identified directly from wearable device feeds of a user or analysis of virtual reality (VR) contents.

In step 202, the computer system or server identifies an object with which a querying user interacts in the metaverse collaborative environment. In some embodiments, in the metaverse collaborative environment, the computer system or a server uses the visual or computing vison technique to identify different types of objects. The different types of objects can be identified based on geographical mapped information. A remote server can perform pre-recognition of the objects, which can be be achieved through tags, labels, or specific metadata associated with each object. In other embodiments, in the metaverse collaborative environment, software installed in a virtual reality (VR) system identifies user queries, such as asking questions, gesture-based queries about the metaverse objects. Based on the eye direction of the user, user's focus will be identified.

In step 203, the computer system or server uses natural language processing (NLP) and natural language understanding (NLU) to understand a question of the querying user about the object. The computer system or server analyzes a user's input of the question, extracts relevant keywords in the question, and understands the context of the question. This step may involve tokenizing the text, removing stop words, and extracting relevant keywords and phrases. The computer system or server considers the context of the user's question to make an accurate determination by paying attention to the overall conversation, previous interactions, and user preferences to better interpret the intent behind the user's question.

In step 204, the computer system or server splits the question into one or more segments. The computer system or server splits the question into meaningful segments or components. To split the question into meaningful segments or components, the computer system or server uses natural language processing techniques such as part-of-speech tagging and syntactic parsing.

In step 205, the computer system or server identifies one or more categories relevant to the question. The computer system or server creates a classification model or a rule-based system to categorize the user's question based on the intent and the content of the question. The computer system or server determines the different categories or topics relevant to the user's question. For example, the computer system or server may determine whether the user wants to get information about user's travel, and the computer system or server may determine some specific information about a place.

In step 206, the computer system or server identifies one or more responses relevant to the one or more segments and to the one or more categories. The computer system or server identifies appropriate sources of information for the one or more responses relevant to the one or more segments and to the one or more categories.

In step 207, the computer system or server determines whether the one or more responses are from one or more public domains or one or more personal sources. The computer system or server creates a classification model or rule-based system which includes categories for public domain queries and personal information queries. The computer system or server analyzes extracted keywords and phrases from the user's question. The computer system or server searches for specific terms that may indicate a request for personal information or a desire for public domain knowledge. For example, keywords such "my," "personal," or "private" may suggest a personal information query. The computer system or server maintains a mapping or database that links types of information to their respective sources; thus, the computer system or server can differentiate between public domain sources (e.g., websites, public databases, and open data) and personal sources (e.g., user accounts, private databases, and personalized data). The computer system or server uses classification results, keyword analysis, and contextual understanding to make a decision on whether the one or more responses come from the public domains or the personal sources. The computer system or server identifies which segments or portions of a response to user's question come from the personal sources of information and which segments or portions of a response are from the public domains.

In step 208, the computer system or server determines whether the one or more responses from the public domains are from one or more authentic sources or one or more unauthentic sources. The computer system or server uses a pre-defined criteria or a third party logic to identify trustworthiness of information sources. These criteria can include factors such as accuracy, reliability, expertise, reputation, bias, transparency, and editorial standards. The computer system or server considers authoritative entities or organizations known for their expertise and reliability; for example, the authoritative entities or organizations may include reputable educational institutions, established research organizations, government agencies, well-known media outlets, and industry experts. The computer system or server performs cross-reference from multiple sources, which will avoid relying solely on a single source of information. Consensus among multiple reliable sources increases the likelihood of trustworthiness. Different third parties can ensure the reliability of information sources and the degree of accuracy.

In step 209, the computer system or server constructs an aggregated response to the question, based on the one or more responses. The computer system or server aggregates the one or more responses from different sources and creates a complete response to user's question.

In step 210, the computer system or server identifies which portions of the aggregated response are the one or more authentic sources, the one or more unauthentic sources, and the one or more personal sources. In this step, the computer system or server identifies one or more authentic sources of the aggregated response, one or more unauthentic sources of the aggregated response, and one or more personal sources of the aggregated response. Once the aggregated response to the user's question is constructed in step 209, the computer system or server will identify whether each portion of the aggregated response is an authentic source, an unauthentic source, or a personal sources. The computer system or server also identifies a degree of authenticity of each portion of the aggregated response. The computer system or server will tag each portion of the aggregated response based on the source of each portion of the aggregated response.

In step 211, the computer system or server constructs a spoken transcript of the aggregated response. In this step, the computer system or server constructs first one or more portions of the spoken transcript which correspond to the one or more authentic sources, second one or more portions of the spoken transcript which correspond to the one or more unauthentic sources, and third one or more portions of the spoken transcript which correspond to the one or more personal sources. The computer system or server segments the text of the aggregated response into individual sentences. The computer system or server uses natural language processing techniques or language-specific rules to identify sentence boundaries accurately. The computer system or server also segments the text based on types of the sources (authentic sources, unauthentic sources, and personal sources). The commuter system or server utilizes a text-to-speech (TTS) system to convert each sentence into the spoken transcript.

In step 212, the computer system or server deploys first one or more avatars for the one or more authentic sources, second one or more avatars for the one or more unauthentic sources, and third one or more avatars for the one or more personal sources. The computer system or server identifies types of the sources (authentic sources, unauthentic sources, and personal sources) in the aggregated response. The computer system or server has an avatar generation system that is capable of dynamically creating avatars in the metaverse collaborative environment. In the metaverse collaborative environment, the computer system or server creates different types of the avatars corresponding to different types of the sources (authentic sources, unauthentic sources, and personal sources) in the aggregated response. The computer system or server will present different types of the avatars for responding the user's question in the metaverse collaborative environment. The computer system or server will show visual distinctions in appearances of the different types of the avatars.

In step 213, the computer system or server maps first one or more portions of the spoken transcript to the first one or more avatars, second one or more portions of the spoken transcript to second one or more avatars, and third one or more portions of the spoken transcript to the third one or more avatars. The respective avatars are dedicated to different types sources in the aggregated response. The computer system or server will map different portions of the spoken transcript to different avatars, and the mapping is based on types of the response authenticity.

In step 214, the computer system or server causes the first one or more avatars to perform a spoken conversation of the first one or more portions of the spoken transcript, with a first type of tone and body language. In this step, the computer system or server causes the first one or more avatars provide the querying user with a spoken conversation based on the one or more authentic sources.

In step 215, the computer system or server causes the second one or more avatars to perform a spoken conversation of the second one or more portions of the spoken transcript, with a second type of tone and body language. In this step, the computer system or server causes the second one or more avatars provide the querying user with a spoken conversation based on the one or more unauthentic sources.

In step 216, the computer system or server causes the third one or more avatars to perform a spoken conversation of the third one or more portions of the spoken transcript, with a third type of tone and body language. In this step, the computer system or server causes the third one or more avatars provide the querying user with a spoken conversation based on the one or more personal sources.

In steps 212, 213, and 214, the commuter system or server will generate human-like voices that can effectively deliver the content in a spoken format. Different types of the avatars shows different types of tone and body language. Therefore, the querying user can identify which information in the aggregated response is authentic, unauthentic, and/or personal.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 3, computing environment 300 contains an example of an environment for the execution of at least some of the computer code involved in performing the inventive methods, such as program(s) 326 for metaverse conversational collaboration. In addition to block 326, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 326, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/ or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located off chip. In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 326 in persistent storage 313.

Communication fabric 311 is the signal conduction path that allows the various components of computer 301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in block 326 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

What is claimed is:

1. A computer-implemented method for conversational collaboration in a metaverse environment, the computer-implemented method comprising:

using natural language processing to understand a question of a user about an object in the metaverse environment;

constructing an aggregated response to the question, based on one or more responses in the metaverse environment;

identifying one or more authentic sources of the aggregated response, one or more unauthentic sources of the aggregated response, and one or more personal sources of the aggregated response;

deploying first one or more avatars for the one or more authentic sources, second one or more avatars for the one or more unauthentic sources, and third one or more avatars for the one or more personal sources; and constructing a spoken transcript of the aggregated response to be performed in the metaverse environment, wherein one or more portions corresponding to the one or more authentic sources are performed by the first one or more avatars in a first type of tone and body language, wherein one or more portions corresponding to the one or more unauthentic sources are performed by the second one or more avatars in a second type of tone and body language, and wherein one or more portions corresponding to the one or more personal sources are performed by the third one or more avatars in a third type of tone and body language.

2. The computer-implemented method of claim 1, further comprising:

identifying the object with which the user interacts in the metaverse environment.

3. The computer-implemented method of claim 1, further comprising:

splitting the question of the user about the object in the metaverse environment into one or more segments;

identifying one or more categories relevant to the question; and identifying the one or more responses, the one or more questions being relevant to the one or more segments and to the one or more categories.

4. The computer-implemented method of claim 3, further comprising:

determining whether the one or more responses are from one or more public domains; and determining whether the one or more responses from the one or more public domains are from the one or more authentic sources or from the one or more unauthentic sources.

5. The computer-implemented method of claim 1, further comprising:

mapping the first one or more portions of the spoken transcript to the first one or more avatars;

mapping the second one or more portions of the spoken transcript to the second one or more avatars; and mapping the third one or more portions of the spoken transcript to the third one or more avatars.

6. The computer-implemented method of claim 1, further comprising:

generating, by an avatar generation system, the first one or more avatars, the second one or more avatars, and the third one or more avatars, including one or more visual distinctions in appearances between each set of avatars.

7. The computer-implemented method of claim 1, wherein the first one or more avatars are presented in the metaverse environment using a first appearance corresponding to the one or more authentic sources, wherein the second one or more avatars are presented in the metaverse using a second appearances corresponding to the one or more unauthentic sources, wherein the third one or more avatars are presented in the metaverse using a third appearance corresponding to the one or more personal sources, and wherein the first appearance, second appearance, and third appearance are all visually distinct from one another.

8. The computer-implemented method of claim 1, wherein a first portion of the spoken transcript is performed by the first one or more avatars, wherein a second portion of the spoken transcript is performed by the second one or more avatars, wherein a third portion of the spoken transcript is performed by the third one or more avatars.

9. The computer-implemented method of claim 8, wherein the first portion of the spoken transcript and the second portion of the spoken transcript are sent to a cloud server, and wherein the third portion of the spoken transcript is stored locally.

10. The computer-implemented method of claim 1, wherein the first type of tone and body language corresponds to a level of confidence associated with the one or more authentic sources, wherein the second type of tone and body language corresponds to a level of confidence associated with the one or more unauthentic sources, and wherein the third type of tone and body language corresponds to a level of confidence associated with the one or more personal sources.

11. A computer program product for conversational collaboration in a metaverse environment, the computer program product comprising a computer readable storage medium having program instructions stored therewith, the program instructions executable by one or more processors, the program instructions executable to:

use natural language processing to understand a question of a user about an object in the metaverse environment;

construct an aggregated response to the question, based on one or more responses in the metaverse environment;

identify one or more authentic sources of the aggregated response, one or more unauthentic sources of the aggregated response, and one or more personal sources of the aggregated response;

deploy first one or more avatars for the one or more authentic sources, second one or more avatars for the one or more unauthentic sources, and third one or more avatars for the one or more personal sources; and construct, a spoken transcript of the aggregated response to be performed in the metaverse environment, wherein one or more portions corresponding to the one or more authentic sources are performed by the first one or more avatars in a first type of tone and body language, wherein one or more portions corresponding to the one or more unauthentic sources are performed by the second one or more avatars in a second type of tone and body language, and wherein one or more portions corresponding to the one or more personal sources are performed by the third one or more avatars in a third type of tone and body language.

12. The computer program product of claim 11, further comprising the program instructions executable to:

identify the object with which the user interacts in the metaverse environment.

13. The computer program product of claim 11, further comprising the program instructions executable to:

split the question of the user about the object in the metaverse environment into one or more segments;

identify one or more categories relevant to the question; and identify the one or more responses, the one or more questions being relevant to the one or more segments and to the one or more categories.

14. The computer program product of claim 13, further comprising the program instructions executable to:

determine whether the one or more responses are from one or more public domains; and determine whether the one or more responses from the one or more public domains are from the one or more authentic sources or from the one or more unauthentic sources.

15. The computer program product of claim 11, further comprising the program instructions executable to:

map the first one or more portions of the spoken transcript to the first one or more avatars;

map the second one or more portions of the spoken transcript to the second one or more avatars; and map the third one or more portions of the spoken transcript to the third one or more avatars.

16. A computer system for conversational collaboration in a metaverse environment, the computer system comprising one or more processors, one or more computer readable tangible storage devices, and program instructions stored on at least one of the one or more computer readable tangible storage devices for execution by at least one of the one or more processors, the program instructions executable to:

use natural language processing to understand a question of a user about an object in the metaverse environment;

construct an aggregated response to the question, based on one or more responses in the metaverse environment;

identify one or more authentic sources of the aggregated response, one or more unauthentic sources of the aggregated response, and one or more personal sources of the aggregated response;

deploy first one or more avatars for the one or more authentic sources, second one or more avatars for the one or more unauthentic sources, and third one or more avatars for the one or more personal sources; and construct, a spoken transcript of the aggregated response to be performed in the metaverse environment, wherein one or more portions corresponding to the one or more authentic sources are performed by the first one or more avatars in a first type of tone and body language, wherein one or more portions corresponding to the one or more unauthentic sources are performed by the second one or more avatars in a second type of tone and body language, and wherein one or more portions corresponding to the one or more personal sources are performed by the third one or more avatars in a third type of tone and body language.

17. The computer system of claim 16, further comprising the program instructions executable to:

identify the object with which the user interacts in the metaverse environment.

18. The computer system of claim 16, further comprising the program instructions executable to:

split the question of the user about the object in the metaverse environment into one or more segments;

identify one or more categories relevant to the question;

identify the one or more responses, the one or more questions being relevant to the one or more segments and to the one or more categories;

determine whether the one or more responses are from one or more public domains; and determine whether the one or more responses from the one or more public domains are from the one or more authentic sources or from the one or more unauthentic sources.

19. The computer system of claim 16, further comprising the program instructions executable to:

map the first one or more portions of the spoken transcript to the first one or more avatars;

map the second one or more portions of the spoken transcript to the second one or more avatars; and map the third one or more portions of the spoken transcript to the third one or more avatars.

\* \* \* \* \*